(No Model.)
J. F. STEVENS & W. V. BREENE.
RUNNING GEAR.
No. 505,139. Patented Sept. 19, 1893.
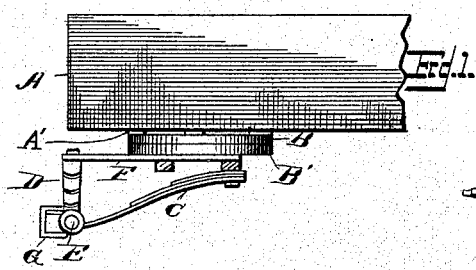
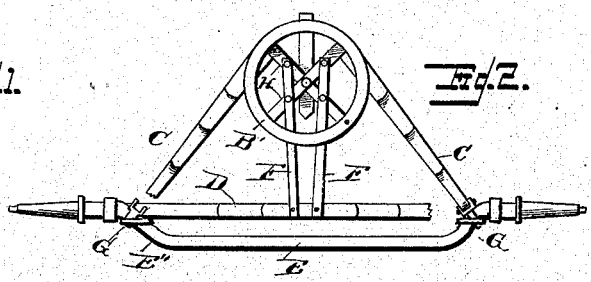
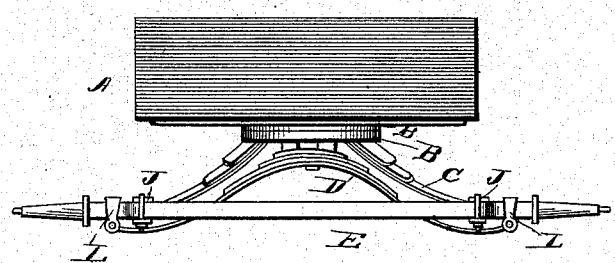
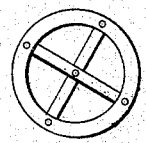
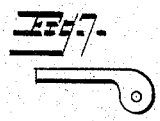
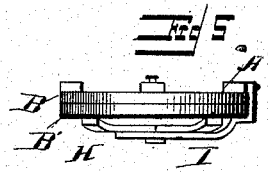
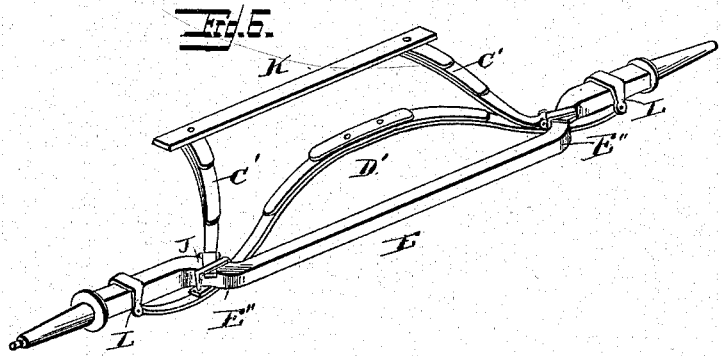
WITNESSES:
J. M. Fowler Jr.
C. M. Chase
INVENTORS:
James F. Stevens
William V. Breene
BY
Niles & Breene
ATTORNEYS.

UNITED STATES PATENT OFFICE.

JAMES F. STEVENS AND WILLIAM V. BREENE, OF PORT CHESTER, NEW YORK.

RUNNING-GEAR.

SPECIFICATION forming part of Letters Patent No. 505,139, dated September 19, 1893.

Application filed June 15, 1892. Serial No. 436,813. (No model.)

*To all whom it may concern:*

Be it known that we, JAMES F. STEVENS and WILLIAM V. BREENE, of Port Chester, in the county of Westchester and State of New York, have invented certain new and useful Improvements in Running-Gear; and we do hereby declare the following to be a full, clear, and exact description of the invention, such as will enable others skilled in the art to which it pertains to make and use the same.

This invention relates especially to short turning running gear, the object being to secure such advantages in construction and operation, as are hereinafter set forth. The front end of the body rests upon a fifth wheel that is itself supported, at a considerable distance in rear of the axle, upon a transverse spring directly over the axle and diverging side springs shackled to the axle in its axial line, and the rear end is supported in an analogous manner, the fifth wheel being, of course, omitted.

In the drawings:—Figure 1 is a side elevation of the front gear supporting a body. Fig. 2 is a plan of the same, the body being removed. Fig. 3 is a front elevation of the same. Fig. 4 is a plan of the lower part of the fifth wheel and bars connected with it. Fig. 5 is a side view of both parts, a certain bar being added. Fig. 6 is a perspective of the rear gear. Fig. 7 is a detail.

In these figures A represents the body, B, B' the fifth wheel, C C side springs diverging from the fifth wheel to the front axle and D a transverse spring in the vertical plane of the axle. The latter is bent or offset forwardly, so that its middle portion lies in front of the axial line and the transverse spring, lying principally above the axle, has its ends passed beneath the bends of the axle and secured to the end portions of the axle by clips or shackles L. This spring and the side springs are of compensating or S form, and hence no reach is necessary and no shackle links are required. The bends in the axle are preferably such that the oblique connecting portions E" are substantially at right angles to the lines of the side springs, so that the latter may be secured to them by ordinary shackles J, such as are used with a straight axle and parallel springs. The upper part of the fifth wheel is fixed to the body A or to bars A' thereon in the usual way. The lower part rests upon bars H to which the rear ends of the side springs are secure and through which the kingbolt passes. Steel braces F F are fastened at their front ends upon the spring D and pass rearward from that spring to the fifth wheel whose front side they support and where they are fixed to the bars H. The rear side of the fifth wheel is supported by a bent bar I held at the front end by the king bolt which passes through it and rigidly fixed at the rear end to the body or a strip thereon. The intermediate portion is bent against the lower surface of the fifth wheel and also against its rear edge. It serves to support the rear side of the fifth wheel as stated, and also to prevent front and rear strain upon the king bolt. Now, by this construction, we secure a cheap and practically successful short turning gear having an ordinary, full-circle, fifth wheel; we place the king bolt far to the rear of the axle and yet avoid the large fifth wheels, or segments thereof, and all track plates, anti-friction contrivances and the like devices common on paper if not in actual vehicles. The diameter of the fifth wheel being small, its parts will not separate and rattle even if it be not extremely heavy, or be not secured together otherwise than by the king-bolt. By bending the axles as described and placing the shackle pivot substantially in the axial line of the axle, neither the thrust of the spring nor the weight of the load tends to twist or rotate the axle. It is obvious that the side spring can be secured directly to the fifth wheel, but we prefer the construction set forth, and prefer the X-like arrangement of bars below the fifth wheel, though they may be one wide bar or two parallel bars. It is further plain that the axle may be bent downward instead of forward without losing the advantages so far as side springs are concerned; but in such case the long, compensating, transverse spring must be shortened, raised or attached by less simple devices.

What we claim is—

1. The combination with an axle having its central portion out of the line of the end portion and integrally connected therewith by an oblique segment at each end, of clips secured to said segments, and springs secured to said clips and extending from the axle in planes approximately perpendicular, respectively, to said segments.

2. The combination with an axle having its middle portion bent out of the vertical plane of the end portions, of a transverse spring, in said plane, secured at its extremities to said axle, a fifth wheel device at some distance in the rear of said spring, and a bar connecting the crown of said spring to said fifth wheel device and rigidly secured to both.

3. The combination with the horizontally offset axle, the transverse spring secured thereto, the fifth wheel device in the rear of the axle, the side springs diverging from said device and secured to the axle in approximately the central line of the axle, and the bars connecting and rigidly secured to said fifth wheel device and the middle of said transverse spring.

4. The combination with an axle, a transverse spring mounted upon the axle and rising above it in its plane, rearwardly converging side springs secured to said axle and connected at their rear ends by a bar, a brace connecting said bar and transverse spring, a lower fifth-wheel-plate resting upon both said brace and bar, and a king bolt for connecting the whole to parts resting upon said fifth-wheel-plate.

5. The combination with the body and a fifth wheel secured beneath the same, of a bar fixed to the body in the rear of the fifth wheel, extending beneath the fifth wheel to support its rear side and engage the king-bolt, a spring mounted upon the front axle, and a brace extending rearward from said spring and supporting the front side of the fifth wheel.

6. The combination of a rear axle having its middle portion laterally offset, of a transverse spring secured to said axle and rising above it in the vertical plane of its central line, forwardly converging side springs secured to said axle approximately in said line, and a transverse bar connecting the forward ends of said side springs, substantially as set forth.

7. The combination with an axle and rearwardly converging side springs attached thereto, of a transverse spring forming an arch above the axle, and a bar connecting the top of said arch to the rear ends of said side springs or rigid attachments thereof.

In testimony whereof we have signed this specification in the presence of two subscribing witnesses.

JAMES F. STEVENS.
WILLIAM V. BREENE.

Witnesses:
HERMAN L. MARSHALL,
J. W. DIEHL.